June 9, 1959 — J. M. CLUWEN — 2,890,400
ROTARY SYSTEM DRIVEN BY ELECTRICAL ENERGY
Filed Oct. 20, 1955
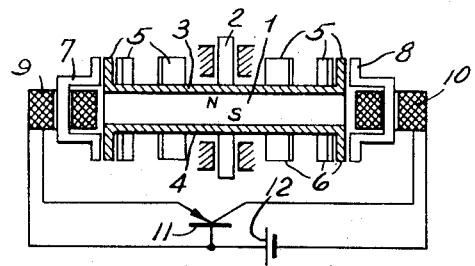
Fig.1
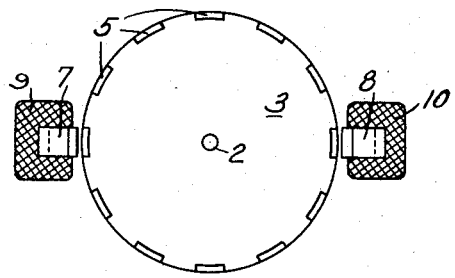
Fig.2
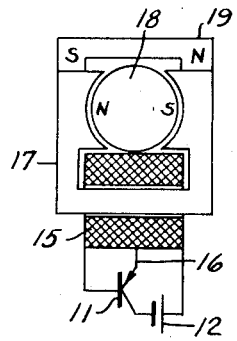
Fig.3
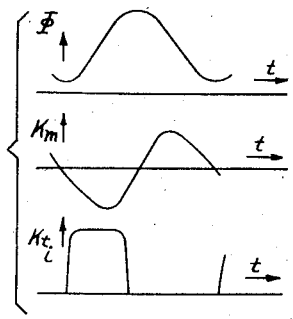
Fig.4
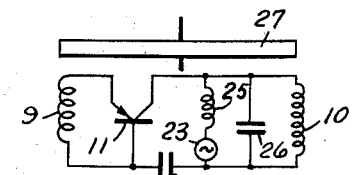
Fig.5
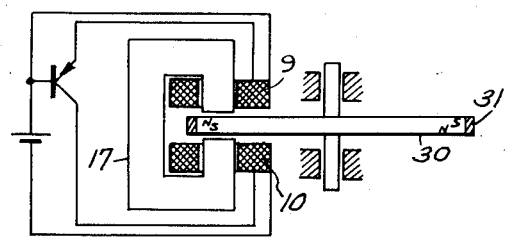
Fig.6
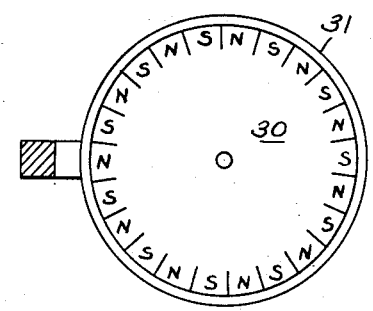
Fig.7
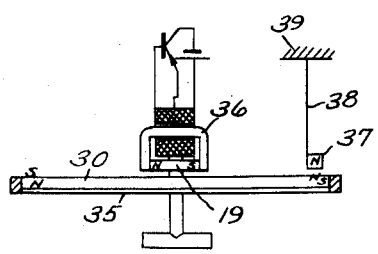
Fig.8
Fig.9
INVENTOR
Johannes Meyer Cluwen
BY Frank R. Trifari
AGENT

United States Patent Office 2,890,400
Patented June 9, 1959

2,890,400

ROTARY SYSTEM DRIVEN BY ELECTRICAL ENERGY

Johannes Meyer Cluwen, Eindhoven, Netherlands, assignor, by mesne assignments, to North American Philips Company, Inc., New York, N.Y., a corporation of Delaware Application October 20, 1955, Serial No. 541,785

Claims priority, application Netherlands November 24, 1954

2 Claims. (Cl. 318—254)

This invention relates to rotary systems driven by electrical energy. It has for its object to provide a simple device which permits, for example, a very high speed of the rotary system, and is charactedized in that the rotary system comprises at least one permanent magnet, poles of which cooperate with a pick-up coil and a driving coil, thus producing electrical oscillations in the pick-up coil which are supplied to the driving coil through an electric amplifier fed by the electrical energy.

Conventional devices comprising rotary systems driven by electrical energy and having permanent magnets are based on the so-called electric motor principle whereby alternating current energy is supplied to the stator windings of an electric motor, thus causing rotation of the permanent magnetic armature of the motor at a speed determined by the frequency of the alternating current. In order to be able to increase the speed, it would be necessary for the alternating-current frequency to be adjusted to steadily increasing values. Due to the invention, the required alternating current is supplied by the electric amplifier, so that its frequency is always matched to the speed of the rotary system.

In order that the invention may be readily carried into effect, it will now be described, by way of example, with reference to the accompanying drawings.

Fig. 1 shows a device according to the invention.

Fig. 2 is a plan view on part of Fig. 1.

Fig. 3 is a variant of Fig. 1.

Fig. 4 shows time diagrams which serve to explain Fig. 3.

Fig. 5 illustrates a different manner of feeding a device as shown in Fig. 1 or 3.

Fig. 6 is another variant of Figures 1 and 3,

Fig. 7 is a plan view on part of Fig. 6.

Fig. 8 is another variant of Figures 1 and 3, in which mechanical means are also shown for stabilizing the speed.

Fig. 9 shows electrical means for stabilisation of speed and frequency.

In the embodiment shown in Figs. 1 and 2, the rotary system comprises a circular magnetic disc 1 of axial magnetisation which is arranged on a shaft 2 and flanked by weak-magnetic discs 3 and 4. The discs 3 and 4 are provided with teeth 5 and 6 by bending of the weak-magnetic material, which teeth cooperate with weak magnetic cores 7 and 8, respectively, of an immovably arranged pick-up coil 9 and a similarly arranged driving coil 10, respectively. The coils 9 and 10 are interconnected via an amplifier 11 and a source of supply 12.

The poles N and S of the disc 1 when rotating via the teeth 5 and 6 produce an alternating magnetic flux in the core 7, thus inducing in the coil 9 an alternating voltage which, after being amplified in the amplifier 11, produces a corresponding current in the coil 10. Said current produces a magnetic field which, with appropriate winding direction of the coil 10, causes at the correct moment attraction of the teeth 5 via the core 8, thus maintaining the rotational movement of the disc 1.

The energy for the device is fully supplied by the source 12, the disc 1, once being started acquiring a steady increasing speed until the energy of the current pulses supplied to the coil 10 and the amplitude of which is limited in conformity with the value of the source 12 is in equilibrium with the energy released by the rotary system 1, 2, 3, 4. With constant load on the rotary system 1, 2, 3, 4, the speed is thus substantially determined only by the value of the source of supply 12 and may increase to very high values inter alia owing to the light construction of the system.

It is possible not only to utilise the rotational energy thus produced, but also the production of the electric current pulses may be the particular purpose of the device. The rotary system may either be connected, for example, to an ultra-centrifuge or a "Nipkow" disc, or form part of a gyroscopic compass. Futhermore, when use is made of a sufficiently large number of teeth, it may be operated at lower speeds, for example for driving the turntable of an electric record player. On the other hand, the electric alternating current produced, if desired after frequency multiplication, may serve to supply an electric circuit, it being posible, if desired, to utlise, for example, automatic frequency control by controlling the value of the source 12.

In the embodiment shown in Figs. 1 and 2, the two coils 9 and 10 may, if desired, be arranged close to one another or even on a common core. Furthermore, it is possible, if necessary, to arrange a plurality of coupled pick-up and/or driving coils along the circumference of the toothed rims of the discs 3 and 4.

Fig. 3 shows an example in which the two coils are united to form one coil 15 having a tapping 16, which is connected to the amplifier 11 so as to constitute during operation a negative resistance parallel to the coil 15. The core 17 of the coil 15 cooperates with a permanent magnetic armature 18 having diametric magnetisation and the rotation of which is maintained by the electrical energy of source 12 in a similar manner as in Figure 1.

The amplifier 11 is preferably operated at class-B adjustment, in which event substantially no output current flows when the rotary system is at rest and hence the voltage pulses across the input of the amplifier are absent, so that the source 12 need supply substantially no energy. The circuit 11—15 of Figure 3 for this purpose is to be adjusted in such manner that it does not start to oscillate or does not keep oscillating of its own accord.

The amplifier 11 could advantageously be a class-B push-pull amplifier. However, if for economy purposes, it is constructed as a monophase amplifier, such as shown, there is a difficulty involved in Figs. 1 and 3. The difficulty is that the cores 7, 8 and 17, on account of the interaction with the magnet poles, may cause the rotational movement to be braked at the moments at which the amplifier 11 is cut off. This may lead to irregularities in the rotational movement.

In the embodiment shown in Figure 1, this difficulty may be avoided by choosing the winding direction of the coils 9 and 10 to be such that at the moments at which the amplifier 11 is unblocked, the core 8 exerts a repelling force upon the teeth 5 and 6 which then just pass along, said force neutralizing the braking force exerted upon the teeth by the core 7.

In the embodiment shown in Figure 3, this is achieved by the use of an auxiliary magnet 19. Figure 4 shows, as a function of the time $t$, the magnetic flux $\phi$ through the core 17, the force $K_m$ exerted by magnets 18 and 19 upon one another, and the force $K_t$ exerted upon the magnet 18, as a result of the current $i$ flowing through the coil 15. Obviously, a force always driving the armature magnet 18 is obtained by the cooperation of the forces $K_m$ and $K_t$.

When the amplifier 11 is a transistor, an advantageous use may be made of the fact that the voltage and current pulses produced have very steep flanks at high speeds, so that it becomes possible to derive considerably greater current pulses from the transistor and hence to supply considerably more energy to the driving coil than on the ground of the product of this current and the supply voltage would be permissible as the maximum power for the transistor, since during these current pulses the voltage produced at the collector electrode of the transistor is still so small only that not only the current pulses are limited, but also so little energy is dissipated in the transistor that a risk of overload may be avoided. However, for high powers, use will be made of electron tube amplifiers, for example thyratron amplifiers.

A transistor also affords the possibility of alternating current supply as shown in Figure 5. The pick-up coil 9 and the driving coil 10, shown diagrammatically, which may be united to form one coil having a tapping as shown in Figure 3, are interconnected via the transistor amplifier 11 as shown in Figures 1 and 3. However, its collector circuit now includes, instead of the source 12 of direct current supply, a source 23 of alternating current supply in series with a comparatively large capacitor 24, which latter during one phase of the alternating voltage of the source 23 is charged by collector-base rectification to a voltage equal to the amplitude of the alternating voltage, whereas during the other phase of the alternating voltage it gradually discharges as a result of the current pulses flowing through the coil 10. By adding an inductor 25 and a capacitor 26, these current pulses may be prevented from flowing away through the source 23 or alternating current from flowing from the source 23 directly through the inductor 10. The speed of the rotary system 27 is in this case independent of the frequency of the alternating voltage.

Figures 6 and 7 show a variant of Figures 1 and 3, the magnet 18 is replaced by a circular disc-shaped magnet 30 having an axial magnetisation whose polarity alternately changes along its circumference. A non-magnetic ring 31 serves to protect the magnet 30 against adverse effects of the centrifugal force, and may also be advantageous in the embodiment of Fig. 1. Since the coils 9 and 10 are arranged on a common core 17, the further advantage is obtained with respect to Figure 1 that the field of the coil 10 intensifies the variations in the flux through the coil 9, leading to current pulses having steeper flanks. If desired, the magnetisation of the magnet 30 could, for example, be chosen to be radial, in which event the construction of the coil 32 must, of course, be modified accordingly.

In the variant shown in Figure 8, the magnetic disc 30, which is axially magnetized as in Fig. 6, is provided on a weak-magnetic carrier plate 35 short-circuiting magnetically the poles of one flat surface of the disc 30. The comparatively narrow poles on the other flat surface co-operate with a coil system 36 identical with that of Figure 3, which system 36 also comprises an auxiliary magnet 19 having a corresponding action as in Figure 3. Similar steps may, of course, also be taken in the embodiment of Figure 6.

Both mechanical and electrical means may serve to stabilize the speed and the frequency of the electrical oscillations produced. Figure 8 embodies a mechanical stabilization constituted by an auxiliary magnet 37 co-operating with the poles of the disc 30 and secured by means of a spring 38 to a fixed point 39, said auxiliary magnet thus extracting mechanical energy from the disc 30 when the disc 30 reaches a speed corresponding to the natural frequency of the resonance system 37, 38, so that further increase of this speed is counteracted. Of course the resonance system 37, 38 may alternatively co-operate with other poles of the disc 30 which are provided nearer to the shaft.

Figure 9 embodies an electrical stabilization comprising a highly selective element 42 included in one of the circuits of the amplifier 11. The element 42, for example a piezo-electric vibrator, which is made of, for example, barium-titanate greatly decreases the gain of the circuit 9, 42, 11, 10 at the moment when the frequency of the electrical oscillations produced approaches the resonance frequency of the element 42, so that this frequency and hence the speed of the rotary system 27 does not increase further.

What is claimed is:

1. Apparatus for maintaining mechanical rotation, comprising a pickup coil, a single permanent magnet of substantially cylindrical configuration mounted in operative relation to said coil and adapted to rotate past said coil, said magnet having a plurality of poles magnetized in a direction transverse to the axis of rotation so arranged with respect to said coil that an electric pulse is produced by said coil each time a portion of said magnet wherein a change of polarity occurs passes in close proximity to said coil, means responsive to said pulses for exerting driving force pulses upon said magnet thereby to sustain said magnet in rotative motion relative to said coil, said pulse responsive means comprising a driving coil mounted in operative relation to said magnet and pulse amplifier means interposed between said pickup coil and said driving coil, said amplifier means being blocked for input signals of one electrical phase and being unblocked for input signals of an electrical phase which is opposed to said one phase, and means for applying an auxiliary force to said magnet to sustain said magnet in rotative motion during the period that said amplifier means is blocked, said last-mentioned means comprising an auxiliary magnet positioned in cooperative relation to said permanent magnet.

2. Apparatus for maintaining mechanical rotation, comprising a magnetic core, a pickup coil mounted on said core, a single permanent magnet of substantially cylindrical configuration mounted in operative relation to said coil and adapted to rotate past said coil, said magnet having a plurality of poles so arranged with respect to said coil that an electric pulse is produced by said coil each time a portion of said magnet wherein a change of polarity occurs passes in close proximity to said coil, means responsive to said pulses for exerting driving force pulses upon said magnet thereby to sustain said magnet in rotative motion relative to said coil, said pulse responsive means comprising a driving coil mounted on said core in operative relation to said magnet and pulse amplifier means interposed between said pickup coil and said driving coil, and an auxiliary magnet positioned in cooperative relation to said permanent magnet, said auxiliary magnet forming a portion of said core.

References Cited in the file of this patent

UNITED STATES PATENTS 2,719,944     Brailsford _____ Oct. 4, 1955